United States Patent [19]

Rundo

[11] 4,400,338
[45] Aug. 23, 1983

[54] METHOD FOR MAKING SEALANT

[75] Inventor: John R. Rundo, Strongsville, Ohio

[73] Assignee: Tremco, Incorporated, Cleveland, Ohio

[21] Appl. No.: 348,906

[22] Filed: Feb. 16, 1982

[51] Int. Cl.³ .............................................. B29F 3/10
[52] U.S. Cl. ................................... 264/171; 264/174; 264/287; 425/112; 425/113; 425/114
[58] Field of Search .............. 264/174, 171, 130, 286, 264/287; 425/113, 114, 112

[56] References Cited

U.S. PATENT DOCUMENTS

| | | | |
|---|---|---|---|
| 2,038,325 | 4/1936 | Van Cleef | 264/130 |
| 2,344,575 | 3/1944 | Warren | 425/113 |
| 2,636,923 | 4/1953 | Perzel | 264/174 |
| 2,708,289 | 5/1955 | Collings | 264/171 |
| 2,753,597 | 7/1956 | Bird et al. | 264/174 |
| 2,985,912 | 5/1961 | Johnson | 264/130 |
| 3,976,530 | 8/1976 | Callan | 264/171 |
| 3,997,285 | 12/1976 | Miyazaki | 425/113 |
| 4,053,269 | 10/1977 | Levy | 425/113 |

Primary Examiner—Jeffery R. Thurlow
Attorney, Agent, or Firm—Joseph Januszkiewicz

[57] ABSTRACT

The method of making a deformable sealant strip having a continuous strip of rigid corrugated material embedded longitudinally within mastic material wherein a continuous linear-rigid spacer is first corrugated and then fed in this condition into an extruder cross head wherein such rigid corrugated spacer is encompassed by a mastic. The strip is coiled for subsequent use in retrofitting double pane windows as well as making dual insulated windows. The extruder that receives the rigid corrugated spacer in its crosshead provides a mastic that surrounds and encompasses the spacer without deforming it.

6 Claims, 9 Drawing Figures

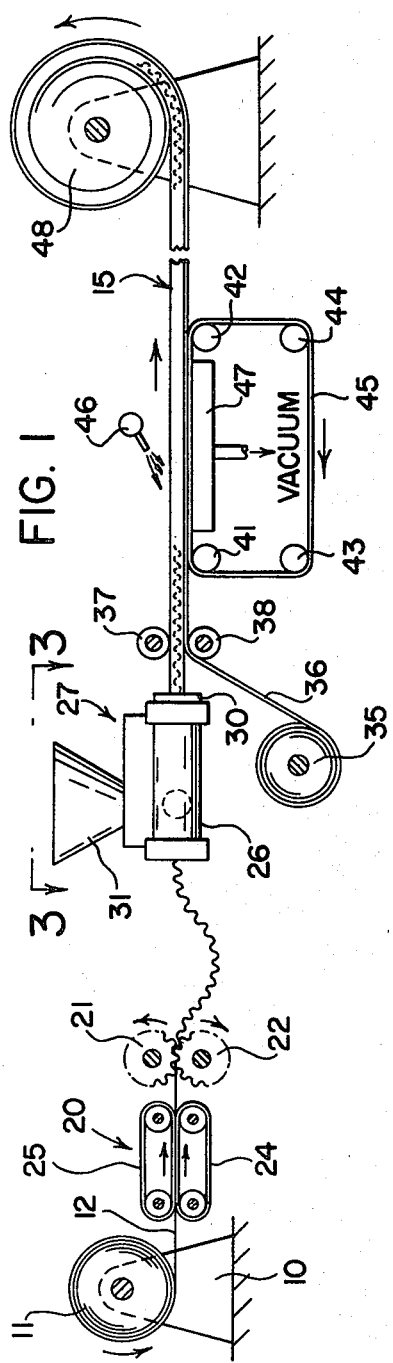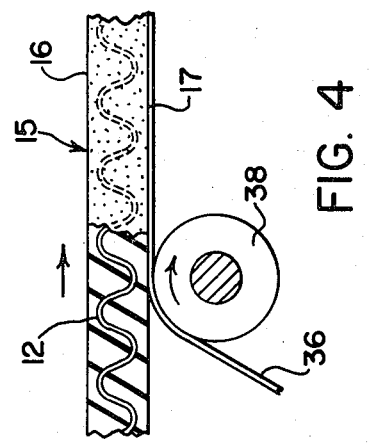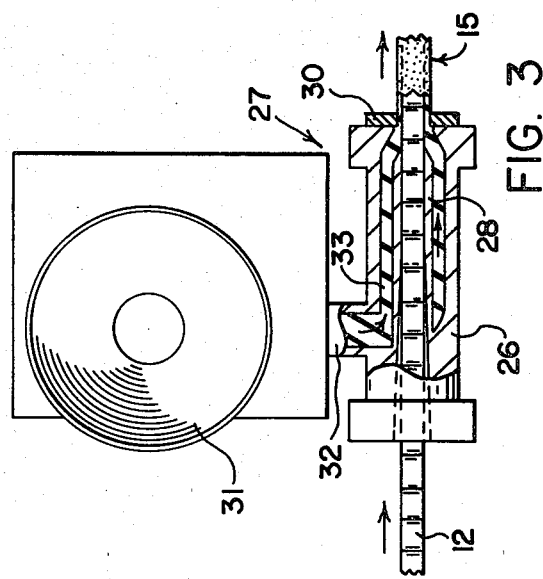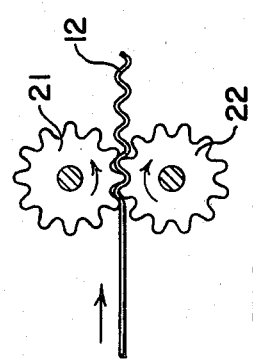

METHOD FOR MAKING SEALANT

BACKGROUND OF THE INVENTION

This invention relates to a method for making sealants such as a swiggle strip sealant for use in double insulated windows as well as for use in retrofitting single pane windows into double pane windows.

In the process of retrofitting windows it was found desirable to provide a coiled swiggle strip that consisted of a deformable sealant tape that had embedded or enveloped therein a continuous rigid spacer member which permitted its use between panes of glass. Such sealant strip could be unwound and placed along the perimeter of a newly cut glass and because of the sealant strip's adhesive quality would adhere to the surface of such glass around the entire perimeter. The glass and strip would then be placed onto an existing windowpane that was mounted in an existing sash of a building. The sealant strip would bond the two windowpanes together along the perimeter thereof in addition to adhering to the sash leaving a dead air space therebetween. The sealant strip has a desiccant therein to maintain the dead air space moisture free. The instant invention is directed to the method of making a coiled sealant in an economical manner, making it economically feasible to utilize a sealant strip or tape that has adhesive properties.

SUMMARY OF THE INVENTION

The present invention contemplates the apparatus and method of making a deformable sealant strip that had rigid undulating spacer therein which spacer is first formed into an undulating shape and then advanced into a cross-head die where the undulating spacer is embedded or encapsulated with a mastic containing an adhesive and a desiccant. The spacer and mastic is extended as a continuous sealant strip having a quadrilateral shape in cross-section. The sealant strip is advanced in a longitudinal direction while non-sticking paper as a continuous strip is applied to the lower surface while the sealant strip is cooled. The sealant strip is then wound into a coil for storage and subsequent use.

BRIEF DESCRIPTION OF THE DRAWINGS

FIG. 1 is a diagrammatic side elevational view of the apparatus in accordance with the invention for fabricating a sealant strip.

FIG. 2 is an enlarged diagrammatical view of the apparatus for corrugating the rigid spacer.

FIG. 3 is a fragmentary plan view with a portion broken away showing a cross head and extruder apparatus.

FIG. 4 is an enlarged view of the sealant strip having a carrier liner being placed on the underneath portion.

DETAILED DESCRIPTION

Figure 5:
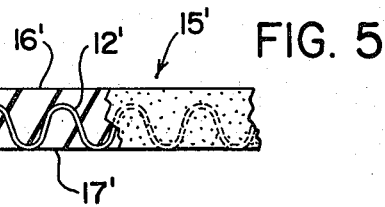

Referring to the drawings, wherein like reference numerals designate like or corresponding parts throughout the several views, there is shown in FIG. 1 a support 10 supporting for rotation a reel 11 having wound thereon a thin strip of continuous length of rigid material such as aluminum for use as a spacer 12 in a sealant strip 15.

The sealant stip 15 (shown in FIG. 4) is an elongated body of deformable mastic or sealant fully enveloping or encapsulating the spacer or spacer means 12 which extends longitudinally of the strip 15. The spacer means 12 is in the form of an undulating ribbon of rigid material such as aluminum. As seen in FIG. 4, the deformable sealant material that encompasses the spacer 12 is in intimate contact with all of the surfaces and edges of the spacer means 12. The sealant strip 15, as disclosed in FIG. 4 has an upper surface 16 and a lower surface 17 with parallel side surfaces. A variation on the structure of such sealant strip 14 (shown in FIG. 4) is that shown in FIG. 5 wherein the sealant strip 15' includes as rigid undulating ribbon or spacer 12' made of a suitable rigid material such as aluminum. The spacer 12' is embedded in deformable mastic or sealant on three sides (an upper side 16' and a pair of parallel side surfaces but not on lower side 17').

The geometry of the spacer means 12 of sealant strip 15 presents a sine curve configuration with side edges closely adjacent the side surfaces of the strip 11. With such geometry of spacer means 12, it is capable of resisting compressive forces exerted on it in a plane which is normal to the side edges of the sealant strip 15. The spacer means 12 would not be able to resist compressive forces on its surfaces 16 and 17 to any substantial extent but would on the side surfaces.

The strip or spacer 12 is fed by a belt feed means 20 or other suitable mechanism to a set of meshing corrugated driven die rolls 21 and 22 powered by means old and well known in the art. The belt feed means includes a pair of lower rollers supporting an endless belt 24 and a pair of upper rollers supporting an endless belt 25. The belts 24 and 25 are driven by suitable drive means.

As the spacer 12 is fed into the rotating die rolls 21 and 22, the spacer is given a sinusoidal curve or corrugation. The die rolls 21 and 22 are similar to a set of meshing gears where the lobes of the die roll 21 mesh with the concave grooves in die roll 22, whereby their rotation is synchronized to impart a sine wave configuration to the spacer means 12. The corrugated spacer 12 is then fed via suitable guide means into the cross head 26 of an extruder 27. The cross head 26 has a sleeve 28 which directs the spacer 12 towards the die head 30. Extruder 27 has a hopper 31 and a feed screw therein driven by a suitable motor in a manner old and well known in the art. Extruder 27 has a die head 32 connecting its output to a chamber 33 in cross head 26 that encompasses the sleeve 28. The extrudate from extruder 27 is directed through chamber 33 and is forced into the respective curves around the spacer 12 as it exits from the sleeve 28. As the extrudate and spacer 12 exit from the die head 30, it emerges as a sealant strip 15 of rectangular cross-section with the spacer 12 enveloped therein.

Located beneath the pass line of sealant strip 15 is a supply roll 35 suitably powered to feed a continuous strip of treated paper or protective liner 36 for abutting contact with the lower surface 17. A pair of opposed rollers 37 and 38 rollingly engage opposite sides of the moving strip 15 downstream of the die head 30 of extruder 27 to move the strip away from the extruder 27. Roller 38 also facilitates the application of the moving strip of paper 36 onto the sealant strip 15 so that the sealant strip 15 can be wound into a coil for storage, moving and subsequent application. Downstream of the roller 37 a plurality of rollers 41-42-43-44 and ancillary rollers not shown support an endless belt conveyor 45 that transports the sealant strip 15 in a linear direction away from the extruder 27 while a cooling means 46 directs a plurality of cool air streams onto the moving sealant strip 15. A vacuum box 47 pulling a vacuum onto belt 45, which has a plurality of holes therein, maintains the sealant strip 15 in contact with the endless belt 45 while it is being conveyed for rollup by a windup reel 48 shown diagrammatically in FIG. 1. For purposes of clarity, the sealant strip 15 and liner 36 are shown in a larger scale in FIG. 1 relative to the die rolls 21, 22, the extruder 27 and the windup reel 48.

In preparing the sealant strip, a reel of coiled rigid material such as aluminum or plastic is either unwound and crimped into a sinusoidal configuration of continuous length and thence advanced into an extruder in the crimped condition where it is surrounded with a deformable mastic material containing a desiccant and an adhesive material. The mastic material with the sinusoidal rigid strip is extruded as a sealant strip having a quadrilateral cross-section. The sealant strip has a tape or liner placed onto the bottom thereof as it is thence cooled and wound into a coil for storage and subsequent usage.

Figure 9:
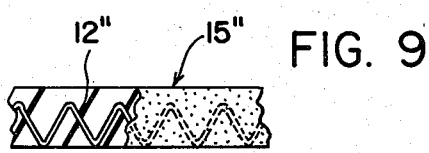

In lieu of the crimping of the rigid material as it is guided to the extruder 27, a pre-crimped or molded strip of plastic 12'' that is pleated as in an accordian may be introduced into the extruder to provide a completely organic sealant strip 12'' (FIG. 9) eliminating thermal transfer between windows.

Figure 6:
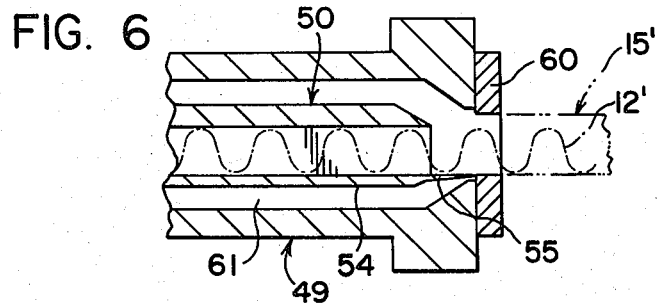
Figure 7:
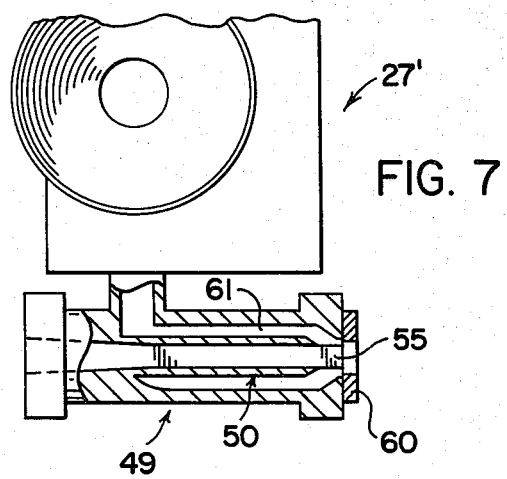
Figure 8:
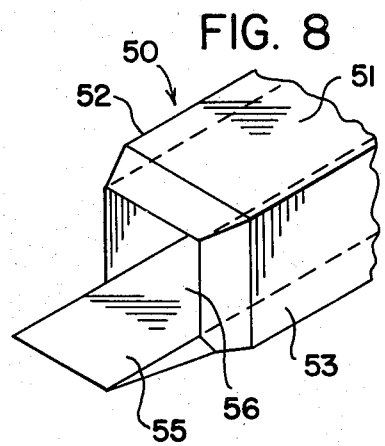

A variation or modification of the extruder 27' is shown in FIGS. 6 through 8 wherein a sleeve 50 within a cross head 49 of extruder 27 is substantially rectangular in cross-section having an upper side 51, and two parallel sides 52 and 53. The lower side 54 of sleeve 50 (FIG. 6) has a lip portion, a side extension or a shelf 55 that projects outwardly or forwardly from the sleeve opening 56, terminating at a die head 60, that is suitably mounted on the forward end of the cross head 49. The extruder 27' is similar in construction and function as the previously described extruder 27 and supplies a melt or extrudate to a chamber 61 in the cross head that envelopes the sleeve 50. The chamber 61 tapers towards the opening at the die head 60, however, since the sleeve 50 terminates prior to the opening in die head 60 except for the shelf 55 which abuts the lower portion of the opening at the die head 60, the extrudate encompasses only three sides of the spacer 12 as the sealant strip exits from the cross head and die head 60. The sealant strip 15' is conditioned (cooled and a strip 36 applied to the bottom surface of stop 15') in the same manner as strip 15.

Various modifications are contemplated and may obviously be resorted to by those skilled in the art without departing from the described invention, as hereinafter defined by the appended claims, as only a preferred embodiment thereof has been disclosed.

I claim:

1. A method for the manufacture of a deformable sealant strip comprising the steps of supplying a continuous length of rigid flat strip of material having spaced side edges, crimping said rigid material into a corrugated ribbon having peaks and valleys defining a sine wave, feeding said corrugated ribbon into an extruder, embedding said corrugated ribbon into a deformable mass of sealant containing an adhesive and a desiccant wherein said sealant fills said valleys and covers said peaks, extruding said embedded ribbon as a continuous length sealant strip along a linear pass line with said ribbon being retained therein in a corrugated form and winding said sealant strip in a roll with a disposable liner between adjacent surfaces.

2. A method for the manufacture of a deformable sealant strip as set forth in claim 1 wherein said winding of said sealant strip into said roll has said side edges lying in planes that are normal to the axis of said roll.

3. A method for the manufacture of a deformable sealant strip as set forth in claim 2 wherein said rigid strip is a thin metal strip.

4. A method for the manufacture of a deformable sealant strip as set forth in claim 2 wherein said rigid strip is a plasic strip.

5. An apparatus for forming a sealant strip comprising an extruder with a cylindrical bore, means for working and extruding material as an extrudate therethrough, a cross head connected to said extruder, a chamber in said cross head communicating with said bore for receiving extrudate therefrom, a die head with an opening therethrough at one end of said cross head from which said extrudate issues therefrom, a sleeve mounted in said cross head for directing a corrugated strip thereinto, said sleeve having an exit opening in said chamber closely adjacent said die head but spaced therefrom to allow said extrudate into said valleys and to encapsulate said corrugated strip thereby forcing the movement of said strip through said cross head.

6. An apparatus for forming a sealant strip as set forth in claim 5 wherein said sleeve is rectangular in cross-section with side portions, one of said side portions having a projecting shelf that contacts said die head to limit the enveloping of said corrugated strip on three of its sides only.

* * * * *